3,051,142
Patented Aug. 28, 1962

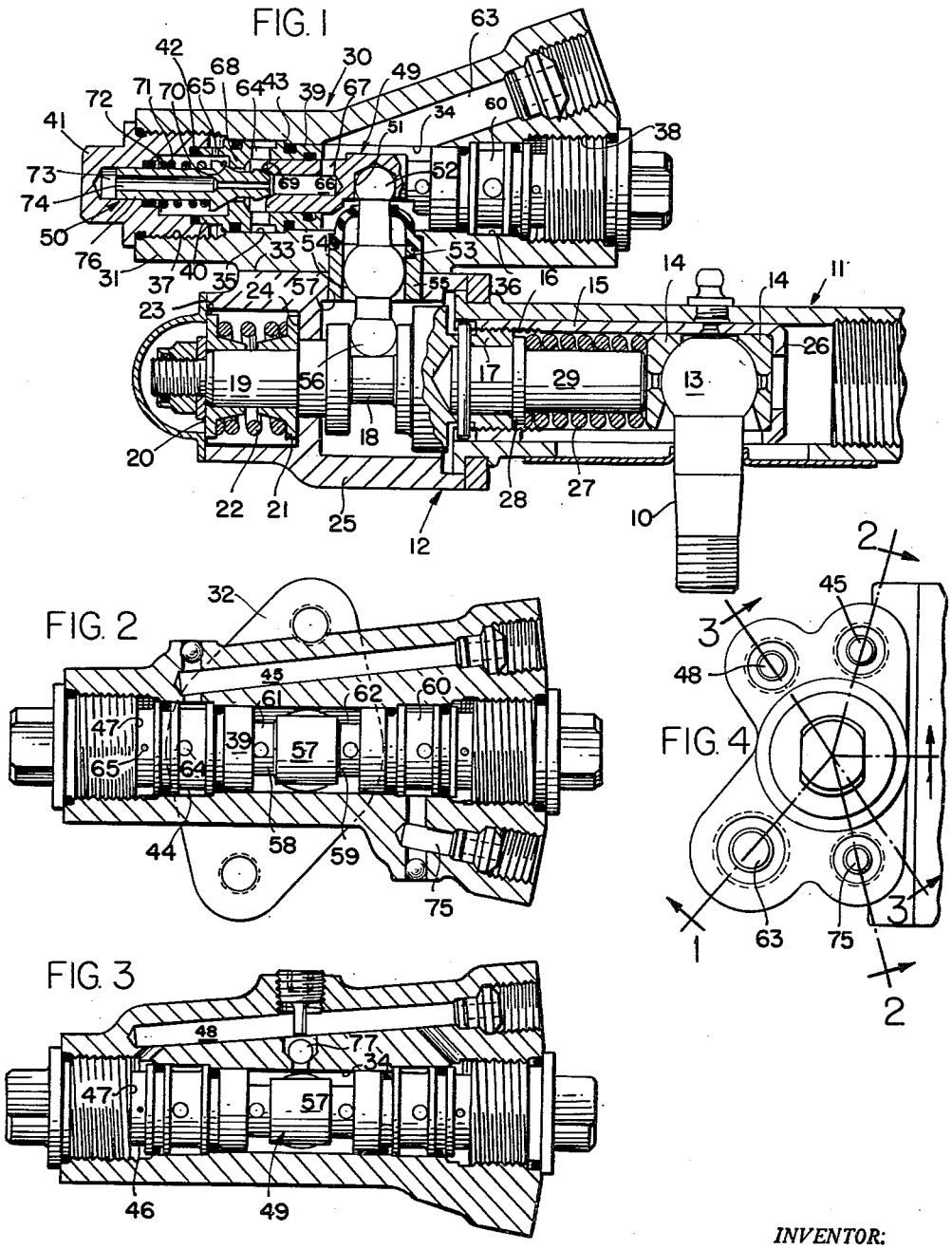

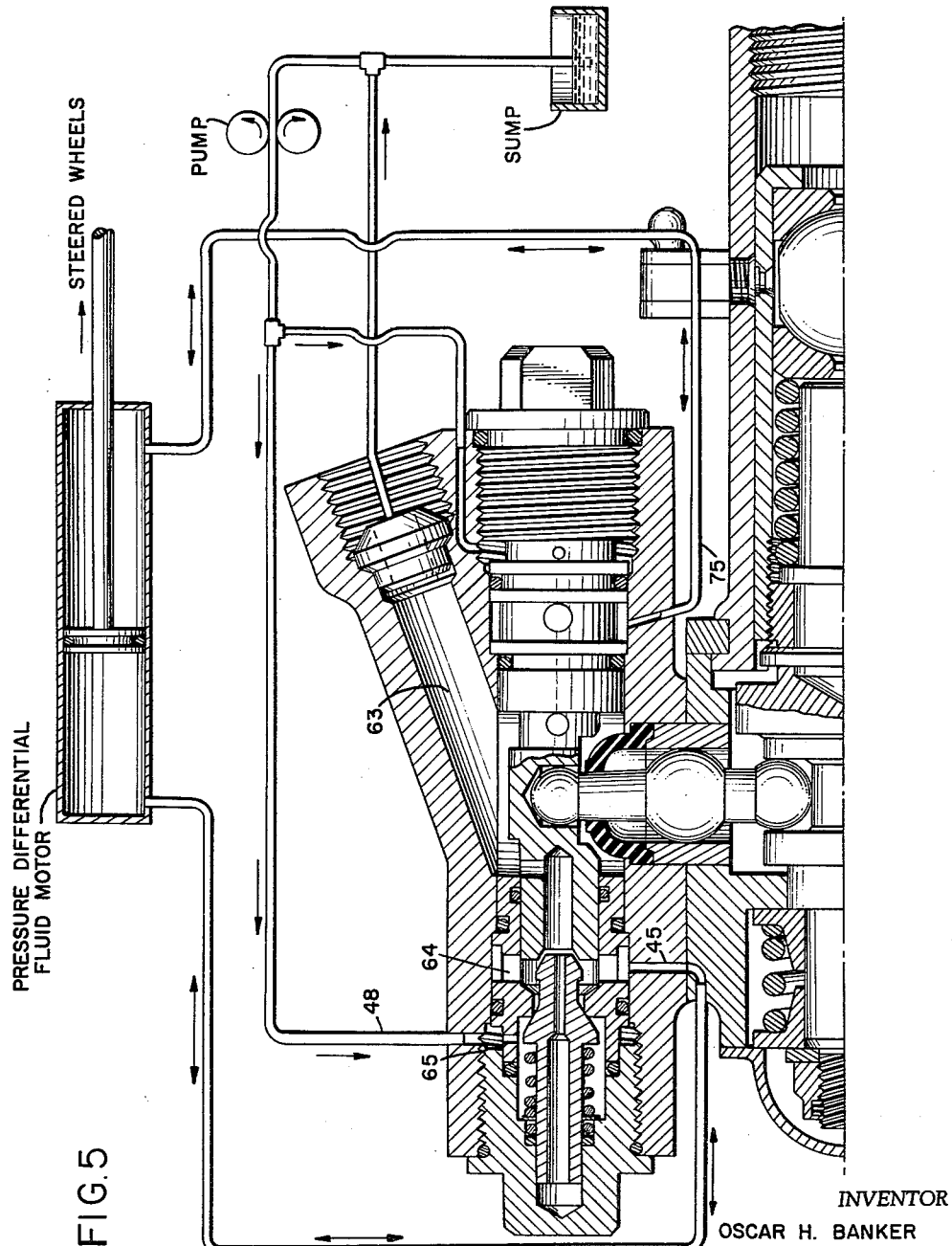

3,051,142
POWER STEERING VALVE
Oscar H. Banker, Evanston, Ill., assignor, by mesne assignments, to Fawick Corporation, Cleveland, Ohio, a corporation of Michigan
Filed July 18, 1958, Ser. No. 749,355
5 Claims. (Cl. 121—46.5)

This invention relates to control valves for pressure differential operated devices and for purposes of illustration will be described with reference to its application to a valve for controlling the operation of a hydraulic cylinder such as is used in power steering devices.

The steering of a vehicle is always a critical operation involving a great deal of the personal element. The "feel" of a steering device, that is, its response to motivation by the operator is an important factor in determining whether a given steering apparatus can be operated with confidence. Where the action between the steered device such as the steering wheels of an automobile and the operator is purely mechanical and direct, the feel is likewise direct, but where an intermediate power-operated device is interposed between the steering wheels and operator to assist the latter in effecting the steering operation it is very probable that the feel will be greatly reduced if not entirely lost.

It is highly desirable that where a power-operated device is interposed in the steering mechanism, the application of the power to the steering operation in response to motivation by the operator shall be smooth and free from sudden power surges, and it is accordingly an object of this invention to provide a valve for controlling the application of power to a steering mechanism or the like in a very smooth and natural manner closely simulating that produced by a direct acting manually operated mechanism.

Another important factor to be considered in producing the necessary "feel" in a steering apparatus is the resistance offered by the device operated by the apparatus to movement of the control element thereof by the operator. This resistance is commonly termed the "steering reaction" and is a force which increases with the deviation of the steered apparatus from the position corresponding to straight line movement of the vehicle.

As another object, therefore, this invention seeks to provide a power-steering mechanism which will produce a reaction force in the control element of power-operated steering device closely simulating the variable force produced by a direct-acting mechanical system in that the said reaction force will increase with the deviation of the steered apparatus from a straight line movement of the vehicle.

As a more specific object, this invention has within its purview the provision of a valve for controlling the application of fluid under pressure to a power cylinder, said valve being constructed to control the passage of operated fluid therethrough in a predetermined manner regardless of the suddenness with which the valve may be operated to allow pressure fluid to flow therethrough.

Another specific object of this invention is the provision of a valve for a power steering device wherein the valve normally cuts off flow of pressure fluid therethrough except when such flow is required to operate the pressure differential motor of the device, thereby conserving energy required to drive the pump by which the fluid under pressure is moved as well as reducing the temperature of the pressure fluid itself.

These and other objects and features of this invention will become apparent from the following detailed description when taken together with the accompanying drawings in which, FIG. 1 is a cross sectional view of a valve constructed in accordance with this invention, together with a cross section of a portion of the immediately adjoining steering mechanism by which the valve is actuated, the section through the valve being taken along line 1—1 of FIG. 4;

FIG. 2 is another section through the valve of FIG. 1 taken along line 2—2 of FIG. 4;

FIG. 3 is yet another section through the valve of FIG. 1 taken along line 3—3 of FIG. 4;

FIG. 4 is an end elevational view of the valve of FIG. 1 looking to the left in that figure; and FIG. 5 is a view similar to FIG. 1, but on an enlarged scale showing schematically the flow of fluid through the valve.

In the description which follows, neither the pressure differential fluid operated device nor the pump and source of fluid under pressure will be described in detail, it being understood that these elements of a power steering system are well known. Only that portion of a steering mechanism that is closely associated with, or directly connected to, the valve of this invention will be described herein.

Referring now to FIG. 1 for a detailed description of the invention, there is shown at 10 a manually operated knuckle, the operation of which consists in a reciprocating movement thereof from side to side across the figure. The reciprocating movement of knuckle 10 controls the operation of the valve of the power mechanism (to be hereinafter described) and also is utilized, when the said power mechanism is inoperative, to move a line 11 which, through other links, is connected to the wheels to be steered. The means by which the knuckle 10 is connected to link 11 is shown generally at 12 and includes a series of parts including the frusto-spherical end 13 of knuckle 10, complementary frusto-spherical bearings 14 disposed one on either side of end 13, a sleeve 15 surrounding and retaining the bearings 14 and having a threaded connection 16 with the end 17 of a spool-shaped yoke 18, the left-hand end 19 of which is connected through appropriate flanged washers 20 and 21 and separating spring 22 to radially disposed abutments 23 and 24 on a housing 25 appropriately secured to link 11.

Movement of knuckle 10 to the right as viewed in FIG. 1 is transmitted from end 13 to sleeve 15 through the right-hand bearing 14 and an inturned flange 26 on sleeve 15. Movement to the left as viewed in FIG. 1 is transmitted from end 13 to the end 17 of the spool-shaped yoke 18 through the left-hand bearing 14, spring 27 and a peripheral flange 28 on a plug 29 disposed within spring 27.

It may be observed that, given a sufficient resistance to lateral movement axially of the link 11 in the direction of the axis thereof, movement of the end 13 in such direction causes relative movement between the spool-shaped yoke 18 and housing 25 in an axial direction with respect to spool 18 and that such movement may be utilized to move a control valve for admitting fluid under pressure to a power cylinder connected to produce thrust in link 11 in the same direction as is produced by end 13 of the knuckle 10.

The valve for controlling the application of fluid under pressure to a power cylinder is shown in its entirety at 30 and is comprised of a valve housing 31 having attaching flanges 32 (FIG. 2) by which it is secured to the side 33 of housing 25.

Valve housing 31 has a through bore 34 with counterbores 35 and 36 disposed on either side of the central portion of through bore 34, said counterbores 35, 36 in turn opening into threaded counterbores 37 and 38, respectively, which continue substantially to the opposite ends of the through bore.

Valve 30 is of the closed center type, that is, of the type which blocks passage of pressure fluid therethrough until such pressure fluid is needed. It is designed to control the operation of a double-acting piston and cylinder (not shown) and hence is in effect two valves, each valve controlling one side of the piston. Inasmuch as the constructifion of each of the two valves is substantially identical, only one of said valves, that is, only one side of the closed center valve will be described in detail herein, it being understood that the other side will have parts which are interchangeable with corresponding parts on the side to be described.

Referring now to FIG. 1, there is disposed in counterbore 35 a sleeve 39 having an axially extending flange 40 over which is telescoped the end of a threaded plug 41 received in threaded counterbore 37 and tightened therein. Plug 41 bears against flange 40 on sleeve 39 through an O-ring seal 42, said sleeve 39, in turn, bearing against the bottom of counterbore 35 through a shoulder 43 formed on the sleeve and by which said sleeve is axially located in the through bore. As shown in FIG. 2, sleeve 39 has a peripheral groove 44 which is in communication with an outlet passage 45 leading to one side of the pressure differential operated device. A peripheral groove 46 (FIG. 3) is formed by flange 40 on sleeve 39 and the end 47 of plug 41. Said peripheral groove 46, as shown in FIG. 3, is in communication with a passageway 48 leading to the source of fluid under pressure.

The valve itself is comprised of a first part 49 located centrally of through bore 34 and a second part 50 disposed largely in sleeve 39 and adapted to be contacted and moved by the first part as will be made clear hereinafter.

Said first part 49 has a recess 51 opening into the side thereof substantially equidistantly from the ends of the part 49 into which extends the rounded end 52 of a lever 53, the central portion 54 of which is restrained against lateral movement by a sleeve 55 extending outwardly from housing 25, the opposite end 56 of lever 53 being received between the sides of the spool-shaped yoke 18. Sleeve 55 is press fitted into opening 57 in said housing 25 so that as the spool-shaped yoke 18 is reciprocated by the knuckle 10 through the instrumentalities aforementioned, lever 53 is rocked in sleeve 55, the rocking motion causing end 52 of lever 53 to be oscillated in the reverse direction from the axial movements of yoke 18. Said oscillations of end 52 are translated into axial movements of the valve part 49 through contact of the end 52 with the sides of recess 51.

As may be more readily apparent from FIGS. 2 and 3, valve part 49 has a central region 57 in which the recess 51 is formed and has laterally extending therefrom cylindrical portions 58 and 59, each of which is received within its respective sleeve 39 on one side and 60 on the other. Between the inner ends of the sleeves 39 and 60 and the central portion 57 of the valve 49 are formed, in effect, peripheral grooves 61 and 62 which are in communication with the vent opening 63 for the valve leading to the sump or reservoir for the fluid used in the system to operate the pressure differential operated motor.

The interior of sleeve 39 is in communication with outlet groove 44 through one or more radially disposed cross-bores 64 and communicates with peripheral groove 46 through a cross-bore 65, the size of which in relation to the volume of the work cylinder is an important element of this invention as will be explained in detail hereinafter. The interior of sleeve 39 is also in communication with peripheral groove 61 through an axially extending passageway 66, which opens into the interior of sleeve 39, and a cross-bore 67 connecting passageway 66 with said peripheral groove 61.

The flow of fluid from one to another of the passages 45, 48 and 63 is controlled by the relative positions of the two parts 49 and 50 of the valve with respect to one another and with respect to an inwardly projecting annular partition 68 disposed between cross-bores 64 and 65.

Valve part 50 is in effect a double poppet valve, the first valve 69 being formed on the right-hand end of the valve part 50 as viewed in FIG. 1, and the second part 70 being formed inward of that end, the seat for valve 69 being formed in the end of passage 66 in valve part 49 and the seat for poppet valve 70 being formed in partition 68. A spring 71, compressed between the second poppet valve 70 and an abutment 72 in plug 41, serves to urge the valve part 50 with its second poppet valve 70 against the seat in partition 68. The space 73 behind valve part 50 is continuously vented to passageway 66 in valve part 49 through aligned bores 74 connecting space 73 with said passage 66.

Valve part 49 is normally maintained in a central equidistant position with respect to the valve part 50 and its counterpart (not shown) in the valve on the right-hand side (FIG. 1) of the valve body 31. In this position the first poppet valve 69 on each side is preferably, though not necessarily, off its seat to provide a continuous passage from both sides of the piston in the work cylinder to the vent passage 63. However, by designing the poppet valve 69 to be removed from its seat under these conditions, the seating of the poppet valve 70, which controls the admission of fluid under pressure to the pressure differential operated motor, is assured and it becomes unnecessary to achieve the difficult result of causing two valves to seat simultaneously on their respective seats. Valve part 49 will assume the aforementioned central position when little or no steering effort is being exerted upon the steering wheels and intermediate steering mechanism, i.e., when no assistance from a power-operated device is required. It is desirable, therefore, under these conditions that the flow of fluid under pressure through the system be stopped to reduce the temperature of the fluid being pumped and also to conserve energy.

The operation of the valve is as follows:

Assuming that it is desired to admit fluid under pressure to outlet passage 45 leading to one side of the piston in the associated work cylinder, the steering knuckle 10 is moved to the right as viewed in FIG. 1 thereby moving bearing 14, sleeve 15 and spool-shaped yoke 18 in the same direction. It may be noted that there is axial clearance between yoke 18 and housing 25 so that if link 11 resists such movement of the knuckle 10, yoke 18 will move axially relative to housing 25, thereby moving end 56 of lever 53 to the right and rocking said lever about its support in sleeve 55 to cause the end 52 of the lever to move to the left as viewed in FIG. 1. This leftward movement of end 52 causes a similar movement in part 49 of the valve, the first part of the said movement in turn, resulting in the seating of first poppet valve 69 on its seat in the end of passage 66, thereby closing said passage to the exterior of the poppet valve 69 and closing cross bore 64 and peripheral groove 44 and its connecting passage 45 to the vent passage 63. The second part of the movement of the valve part 49 causes both said valve part 49 and the valve part 50 to move together to the left as viewed in FIG. 1, thereby unseating poppet valve 70 and establishing communication from cross bore 65, through the annular partition 68 and around the exterior of valve part 50 intermediate the poppet valve part 69 and 70, to the cross bore 64. This allows fluid under pressure to flow from inlet passage 48 and peripheral groove 46 through cross bore 65 and thence through the sleeve and cross bore 64 into the outlet passage 45 leading to the said one side of the piston in the work cylinder (FIG. 5).

It may be apparent that while valve part 49 is moving toward poppet valve 69 to seat said poppet valve thereon as aforesaid, the opposite effect is being created on the other side of said part 49, namely, the vent opening 63 is connected to the peripheral groove 62 and through the sleeve 60 to a passageway 75 (FIG. 2) leading to the opposite side of the piston to allow said opposite side to drain freely.

The rapidity with which fluid under pressure is admitted to the work cylinder has an important bearing on the characteristics of the steering mechanism, particularly as to the "feel" produced by the mechanism. In the present design the flow of fluid under pressure from the inlet passage 48 to the outlet passage 45 leading to the cylinder is restricted by making the cross bore 65 of a very small diameter. This restriction retards the filling of the work cylinder with pressure fluid and avoids a jerky action thereof. The exact diameter of the cross bore 65 may be determined for any particular design of valve to provide a smooth application of fluid under pressure to the power cylinder.

After poppet valve part 70 is moved off its seat to admit fluid under pressure to cross bore 64, the interior of sleeve 39 is, of course, filled with fluid under pressure which is acting in all directions. A portion of this pressure is directed against the left-hand end of the valve part 49 as viewed in FIG. 1 and tends to urge said valve part back to its central position. This pressure is transmitted back through the lever 53 and associated mechanism to steering knuckle 10 and provides a resistance which is felt by the operator as he applies steering effort to said steering knuckle. The amount of this back pressure can be altered by varying the effective area of the valve part 49 exposed to the fluid under pressure.

The effective diameters of both valves 69 and 70 are identical and are equal to the outside diameter of the rear portion 76 of the valve part 50. Thus when valve 70 is closed there is no fluid pressure component acting in an axial direction upon the valve 70 and hence the valve will be held against its seat on wall 68 by spring 71. Similarly, when valve 70 is off its seat and valve 69 is closed by reason of the movement of the valve part 49 to the left as viewed in FIG. 1, the portion of the valve part between poppet valves 69 and 70, though of reduced diameter, is nevertheless balanced in the same manner as a spool valve is balanced and hence there again is no fluid pressure component acting upon valve part 50 in an axial direction. The pressure of spring 71 will then be transferred to valve 69 to hold said valve against its seat on the valve part 49.

In one illustrative embodiment of the valve designed for a passenger vehicle, orifice 65 was made of such size as to allow 1½ gallons per minute flow therethrough under a maximum unit pressure of 1000 pounds per square inch in the inlet passage 48. The spring 71 in this illustrative embodiment exerted four pounds total pressure upon the valve part 50.

In the interest of safety it is necessary that the power steering mechanism does not interfere with a fully manual operation of the steered apparatus when the fluid under pressure for some reason or other becomes unavailable. With the arrangement shown in FIG. 1, for example, it may be appreciated that movement of link 11 and its associated piston cannot be effected without creating a sub-atmospheric pressure in the work cylinder connected to link 11 which, in turn, becomes effective, through the valve, in the inlet passage 48. Since said passage is connected to the output of a pump or the like which, in general, is sealed to the atmosphere, such further movement of the piston becomes extremely difficult, if not impossible to accomplish.

To overcome the defect mentioned above, the present embodiment is provided with a check valve 77 (FIG. 3) which connects throughbore 34 in the central region thereof with the inlet passage 48, valve 77 being arranged to close when pressure in inlet passage 48 exceeds that in counterbore 34 and to open when these conditions are reversed. Thus, fluid may be drawn freely from the relatively large vent passage 63 and counterbore 34 through the check valve 77 and into the inlet passage 48 to equalize the pressure on both sides of the associated pressure differential operated device and thereby achieve unrestricted movement of the steering link 11.

It may be apparent from the foregoing description that since the valve parts are substantially symmetrical about a plane passing transversely of the axis of the parts substantially midway between the ends of the throughbore 34, a simplified construction results in that the valve parts and sleeves for the most part are interchangeable as between the two sides of the valve. This feature results in a substantial reduction in tooling and inventory required to produce the valve in large quantities and hence results in a less expensive valve.

It is understood that suitable sealing means may be employed wherever desired or necessary between the various sleeves, valves and valve body to achieve the results desired. In the embodiment illustrated in the accompanying drawings, such sealing means takes the form of well known "O" rings made of elastomeric material and readily available commercially in a large variety of compositions and sizes.

It is understood that the foregoing description is merely illustrative of a preferred embodiment of the invention and that the scope of the invention is not to be limited thereto but is to be determined by the appended claims.

I claim:

1. In a valve for controlling the flow of fluid under pressure to a double-acting work cylinder, the combination of a valve body having a longitudinal bore therein, said longitudinal bore being in communication with a first cross-bore centrally located with respect to the longitudinal bore and substantially at atmospheric pressure, with two axially spaced cross-bores disposed one on either side of said first cross-bore and connected to opposite sides of said work cylinder, and with other axially spaced cross-bores disposed in proximity to the axially spaced cross-bores and connected to a source of fluid under pressure; a first valve element in the bore having centrally located passages, each of said passages communicating with the first cross-bore, an actuator for the first valve element to impart reciprocating axial movement thereto, spaced poppet valve elements in the valve bore, said poppet valve elements being mutually exclusively engageable and axially movable by the first valve element, poppet valve seats in the bore disposed between the cross-bore connected to a side of said cylinder and a cross-bore connected to a source of fluid under pressure, said poppet valve elements having portions thereof continuously exposed to and hydraulically balanced with respect to the fluid in the cross-bores connected to said source of fluid under pressure, and said poppet valves having other portions seating upon the first valve element to close the centrally located passages therein upon engagement of said poppet valves by said first valve element.

2. In a valve for controlling the flow of fluid under pressure to a double-acting work cylinder, the combination as described in claim 1, said first valve element being unbalanced as to the pressure of the fluid in the cross-bores connected to the work cylinder whereby to produce a reaction upon the actuator proportional to the pressure in said cross-bores connected to the work cylinder.

3. In a valve for controlling the flow of fluid under pressure to a double-acting work cylinder, the combination as described in claim 1, said valve body having spaced recesses therein disposed at opposite ends of said longitudinal bore, and said poppet valves having extensions thereon received in said recesses to guide said poppet valves in the axial movement thereof.

4. In a valve for controlling the flow of fluid under pressure to a double-acting work cylinder, the combination as described in claim 1, said other axially spaced cross-bores connected to a source of fluid under pressure being smaller in diameter than the axially spaced cross-bores connected to opposite sides of said work cylinder whereby to restrict the maximum rate of flow of the fluid under pressure to said work cylinder.

5. In a valve for controlling the flow of fluid under pressure to a double-acting work cylinder, the combination as described in claim 1, said valve body having a passage connecting the first cross-bore with a source of fluid under pressure, and a check valve in said last mentioned passage adapted normally to close the said passage to said source of fluid under pressure and to open said passage to said source when the pressure in the cross-bore exceeds the pressure in said source of fluid under pressure.

References Cited in the file of this patent

UNITED STATES PATENTS

| | | |
|---|---|---|
| 1,609,273 | Davis | Nov. 30, 1926 |
| 2,404,281 | Eaton | July 16, 1946 |
| 2,432,721 | Brown | Dec. 16, 1947 |
| 2,486,988 | Schafer et al. | Nov. 1, 1949 |
| 2,525,626 | Stouffer et al. | Oct. 10, 1950 |
| 2,565,929 | Onde | Aug. 28, 1951 |
| 2,650,669 | Hammond | Sept. 1, 1953 |
| 2,798,461 | Gold | July 9, 1957 |
| 2,821,211 | Wittren | Jan. 28, 1958 |
| 2,851,912 | Banker | Sept. 9, 1958 |